United States Patent
Zhang (10) Patent No.: US 11,327,632 B2
(45) Date of Patent: May 10, 2022

(54) METHODS, APPARATUSES, BROWSERS, AND ELECTRONIC DEVICES FOR PROVIDING WEBSITE NAVIGATION ICONS

(71) Applicant: Alibaba Group Holding Limited, Grand Cayman (KY)

(72) Inventor: Xun Zhang, Guangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 140 days.

(21) Appl. No.: 15/914,511

(22) Filed: Mar. 7, 2018

(65) Prior Publication Data
US 2018/0260098 A1    Sep. 13, 2018

(30) Foreign Application Priority Data
Mar. 7, 2017   (CN) .......................... 201710130295.8

(51) Int. Cl.
*G06F 17/00* (2019.01)
*G06F 3/04817* (2022.01)
*H04L 67/568* (2022.01)
*G06F 3/0483* (2013.01)
*H04L 67/53* (2022.01)

(52) U.S. Cl.
CPC ........ *G06F 3/04817* (2013.01); *G06F 3/0483* (2013.01); *H04L 67/20* (2013.01); *H04L 67/2842* (2013.01)

(58) Field of Classification Search
None
See application file for complete search history.

(56) References Cited

U.S. PATENT DOCUMENTS

| | | | | |
|---|---|---|---|---|
| 8,019,579 | B1* | 9/2011 | Wey | G06F 8/10 703/6 |
| 8,407,576 | B1* | 3/2013 | Yin | G06F 3/0481 715/206 |
| 2010/0115430 | A1* | 5/2010 | Skirpa | G06F 17/2247 715/760 |
| 2011/0009984 | A1* | 1/2011 | Mukhi | G05B 23/0232 700/83 |
| 2011/0066977 | A1* | 3/2011 | DeLuca | G06F 16/9535 715/811 |
| 2011/0302234 | A1* | 12/2011 | Monk, IV | H04L 65/80 709/203 |
| 2013/0346960 | A1* | 12/2013 | Gupta | G06F 8/65 717/170 |
| 2014/0173417 | A1* | 6/2014 | He | G06F 16/986 715/234 |
| 2015/0009230 | A1* | 1/2015 | Matsuhashi | G06F 16/51 345/619 |
| 2015/0081633 | A1* | 3/2015 | Su | H04L 41/0856 707/634 |

(Continued)

*Primary Examiner* — Mustafa A Amin
(74) *Attorney, Agent, or Firm* — Alston & Bird LLP (57) ABSTRACT

The present disclosure provides a method, an apparatus, a browser, and electronic devices for providing website navigation icons. The method includes providing a website navigation icon; and through the website navigation icon, providing a service offered within the website that is navigated by the website navigation icon. According to the method, apparatus, browser, and electronic devices provided in the present disclosure, the user experience may be improved.

20 Claims, 5 Drawing Sheets

(56) References Cited

U.S. PATENT DOCUMENTS

2015/0193390 A1\* 7/2015 Stekkelpak ......... G06F 16/9558
715/207
2016/0125074 A1\* 5/2016 Chakra ................ G06Q 30/02
707/737

\* cited by examiner

METHODS, APPARATUSES, BROWSERS, AND ELECTRONIC DEVICES FOR PROVIDING WEBSITE NAVIGATION ICONS

CROSS REFERENCE TO RELATED APPLICATIONS

This application claims the priority of Chinese Patent Application No. CN 201710130295.8, filed on Mar. 7, 2017, the content of which is incorporated herein by reference in its entirety.

FIELD OF THE DISCLOSURE

The present disclosure generally relates to the field of browser technology and, more particularly, relates to methods, apparatuses, browsers, and electronic devices for providing website navigation icons.

BACKGROUND

In current technology, when a user accesses a website through a browser, an address of the website (e.g., a uniform resource locator, URL) can usually be bookmarked or saved. As a result, the browser can provide a website navigation icon corresponding to the website in the navigation page for the user to quickly access the website. The website navigation icon is a shortcut to the address of the website. By clicking the website navigation icon in the navigation page, the user can quickly and directly access the corresponding website without having to memorize the complicated address of the website. In such a way, the user does not have to enter the address multiple times or repeatedly type in the address, and thus the user experience may be improved. Therefore, the website navigation icons used by browsers have attracted more and more people's attention.

Currently, the website navigation icons provided in the navigation pages of browsers are static icons. For example, a website navigation icon may be automatically generated by a browser for the website that the user has visited. By clicking on such a static website navigation icon, the user can only access the corresponding website.

However, with the continuous development of the information society, there is a growing demand for quick and convenient access to information. The conventional method to provide static website navigation icons is no longer sufficient for people to quickly and easily access the services provided within the website when using browsers.

For example, when a user needs to access some of the services provided by a website, each time the user may click the website navigation icon to enter the website first, and then access the above services provided within the website. Such technology has been very difficult to meet the growing needs of people.

Therefore, there is a need to provide a new technical solution to improve at least one of the technical problems in the prior art.

BRIEF SUMMARY OF THE DISCLOSURE

According to one aspect of the present disclosure, a method for providing a website navigation icon is provided. The method includes the following steps: providing a website navigation icon; and through the website navigation icon, providing a service offered within the website that is navigated by the website navigation icon.

Optionally, the service includes information resources provided by the website.

Optionally, the information resources include at least one of time information and weather conditions.

Optionally, the service includes linked items in the website.

Optionally, the service is provided when an operation of a user on the website navigation icon is received.

Optionally, the operation includes long-pressing or double-clicking the website navigation icon.

Optionally, the method also includes the following step: receiving and storing a website navigation icon file, used to generate the website navigation icon, from a server.

Optionally, the website navigation icon file includes a version number corresponding to the website navigation icon file.

Optionally, the method also includes the following step: updating the stored website navigation icon file.

Optionally, updating the stored website navigation icon file includes: sending the version number corresponding to the stored website navigation icon file to the server; receiving an updated website navigation icon file from the server; and providing an updated website navigation icon according to the updated website navigation icon file.

Optionally, the updated website navigation icon is provided at a predetermined time interval.

Optionally, the service is provided by using the client-terminal cached website information.

Optionally, using the client-terminal cached website information is determined based on the network status.

According to another aspect of the present disclosure, an apparatus for providing a website navigation icon is provided. The apparatus includes a device configured to provide a website navigation icon, and a device configured to, through the website navigation icon, provide a service offered within the website navigated by the website navigation icon.

According to another of the present disclosure, a browser is provided. The browser includes the apparatus for providing the website navigation icon according to the present disclosure, or is designed to execute an operation based on the method for providing the website navigation icon according to the present disclosure.

According to another aspect of the present disclosure, an electronic device is provided. The electronic device includes a browser according to the present disclosure.

According to another aspect of the present disclosure, an electronic device is provided. The electronic device includes a processor, a memory, and a display. The memory is configured to store instructions. The instructions are used to control the processor to perform an operation to execute the method for providing the website navigation icon according to the present disclosure.

According to the methods, the apparatuses, the browsers, and the electronic devices provided in the present disclosure, the user experience may be improved.

Therefore, the technical task to be accomplished or the technical problems to be solved according to the present disclosure have never been considered or expected by those skilled in the art. Therefore, the present disclosure provides a new technical solution.

Other features and advantages of the present invention will become more comprehensible from the following detailed description of exemplary embodiments of the present disclosure with reference to the accompanying drawings.

BRIEF DESCRIPTION OF THE DRAWINGS

The accompanying drawings, which are incorporated in and constitute a part of the specification, illustrate various embodiments of the present disclosure and, together with the description, serve to explain the principles of the present disclosure.

DETAILED DESCRIPTION

Various exemplary embodiments of the present disclosure will now be described in detail with reference to the accompanying drawings. It should be noted that the relative arrangement of the components and the steps, numerical expressions, and numerical values set forth in these embodiments do not limit the scope of the present invention unless it is specifically stated otherwise.

The following description of at least one exemplary embodiment is merely illustrative in nature and, by no means, is to be construed as any limitation on the present invention and its application or use.

Techniques, methods, and devices known to those of ordinary skill in the relevant art may not be discussed in detail but, where appropriate, the techniques, methods, and devices should be considered as a part of the description.

In all of the examples shown and discussed herein, any specific value should be interpreted as merely illustrative and not as a limitation. Therefore, other examples of the exemplary embodiments may have different values.

It should be noted that the same reference numbers and letters designate the same or similar parts in the following drawings. Therefore, once a part is defined in a drawing, the same or similar parts will not need to be further defined in subsequent drawings.

In the following, embodiments and examples according to the present disclosure are described with reference to the accompanying drawings.

Figure 1:
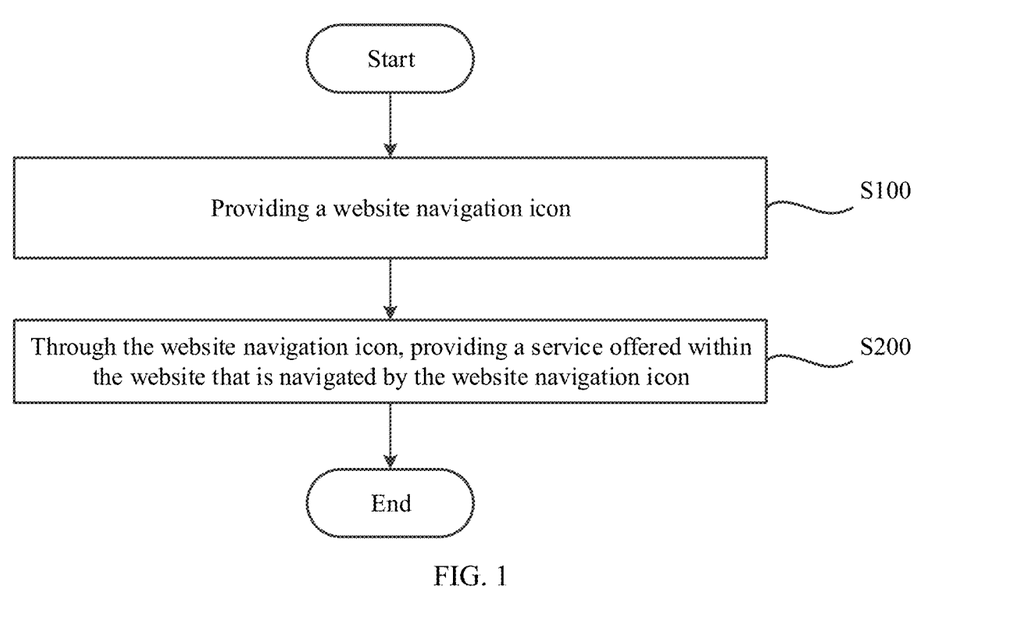
FIG. 1 illustrates a schematic flowchart of an exemplary method for providing a website navigation icon consistent with various embodiments of the present disclosure.

FIG. 1 illustrates a schematic flowchart of an exemplary method for providing a website navigation icon consistent with various embodiments of the present disclosure.

In Step S100, a website navigation icon may be provided.

For example, the website navigation icon may be displayed when a user opens a browser. Alternatively, the website navigation icon may be displayed when a user creates a new browser bookmark page.

The website navigation icon may be acquired from the server on the network when the user opens a browser or creates a new bookmark page. In other embodiments, the website navigation icon may be acquired from the website and cached locally when the user was previously accessing the website.

In Step S200, a service offered within the website that is navigated by the website navigation icon may be provided through the website navigation icon.

For example, the service offered within the website that is navigated by the website navigation icon may include information resources provided by the website. The information resources may include at least one of time information and weather conditions. Because the information, such as weather, time, etc., may change in real time, in one embodiment, the information resources in the icon may be periodically updated.

For example, the service offered within the website that is navigated by the website navigation icon may include linked items in the website. For example, the service may include "Sports", "Military", "Finance", etc. in the portal site.

For example, the service may be provided when an operation of a user on the website navigation icon is received. The operation may include long-pressing or double-clicking the website navigation icon. In one embodiment, when the user presses the website navigation icon for a long time, items such as "Sports", "Military", "Finance", etc. in the portal site may be displayed. The user can directly click on one of the items to access the corresponding website channel without entering the homepage of the portal site first. The items may be selected according to the user's preference. The user's preference may include the website channels that are frequently accessed by the user. On one hand, setting the website channels that are frequently accessed by the user as the items to be displayed may save the user the operation to access the homepage of the website. Therefore, for a mobile user, the consumption of the data plan may be reduced. On the other hand, setting the website channels that are frequently accessed by the user as the items to be displayed may also improve the user experience.

Optionally, a website navigation icon file for generating the website navigation icon may be received from the server and then stored. The update of the website navigation icon can be achieved by updating the stored website navigation icon file. The update may be performed every time when a browser is opened or a new tab is created. A website navigation icon file is a file used to generate a website navigation icon. For example, a dedicated server may be used to generate the file. The server may generate different website navigation icon files with respect to different websites, different user interaction requirements, etc. According to the existing technology, since a browser generates website navigation icons locally according to the keywords of the website titles, the generated website navigation icons may have a single style, and thus may be lack of recognition. According to the present disclosure, the website navigation icons may be generated by the servers. As compared to the client terminals, the servers may have more resources, and the designers may be able to design and configure the servers more easily. Therefore, by adopting the disclosed method, the styles of the icons may have more options, and thus the user experience may be improved.

The website navigation icon file may include a corresponding version number. The version number may indicate the version of the stored website navigation icon file. Therefore, the version number may help update the stored website navigation icon file, and further update the website navigation icon. In one embodiment, the version number may be a time stamp of the file. The browser may use the time stamp to determine whether to update the current website navigation icon file.

For example, the version number corresponding to the stored website navigation icon file may be sent to the server on a regular basis or upon request. Since the version number may indicate the version of the stored web navigation icon file, the server may determine whether the website navigation icon file needs to be updated according to the version number.

When an updated website navigation icon file exists, the updated website navigation icon file may be received from the server.

The updated website navigation icon may be provided based on the updated website navigation icon file. As such, updating the website navigation icon may be achieved.

In one embodiment, the updated website navigation icon may be provided at a predetermined time interval. For example, updates may be provided hourly or daily.

For example, for a website, the internal items may be relatively fixed, that is, the internal items of the website may not be changed for a certain period of time. In one embodiment, the internal items may be "Sports", "Military", "Finance", etc. in the portal site. Therefore, the website navigation icon may be provided, instead of through a real-time downloading mechanism, through the updating mechanism described above. In this situation, the updating mechanism may be beneficial.

Optionally, based on the status of the network, the service may be provided using the website information cached at the client terminal. For example, when a user connects to the network using a mobile data plan instead of using a free Wi-Fi, the website information cached at the client terminal may be used to provide the service such that the consumed data plan for providing the website navigation icon may be reduced. Moreover, when the network connection signal is poor, the website information cached at the client terminal may be used to provide the service such that slow response caused by the receiving process from the server may be avoided.

According to the conventional method for providing static website navigation icons, a user accesses a website by clicking on a corresponding static website navigation icon. However, each time when a user needs to access a service offered within the website, the user should click the website navigation icon to enter the website first, and then access the service offered within the website. According to the method of the present disclosure, a website navigation icon is provided; and through the website navigation icon, a service offered within the website that is navigated by the website navigation icon is provided. Therefore, when a user needs to access a service offered within the website, the user can directly access the desired service without going through the complicated process which requires to access the website first before accessing the desired service.

In addition, according to the present disclosure, updating the provided website navigation icon may allow the user to access the latest information service provided in the website, and also ensure that the user have access to the services of the linked items that are synchronized with the inside of the website.

In the following, various embodiments of the present disclosure will be described with reference to the accompanying drawings.

Figure 2:
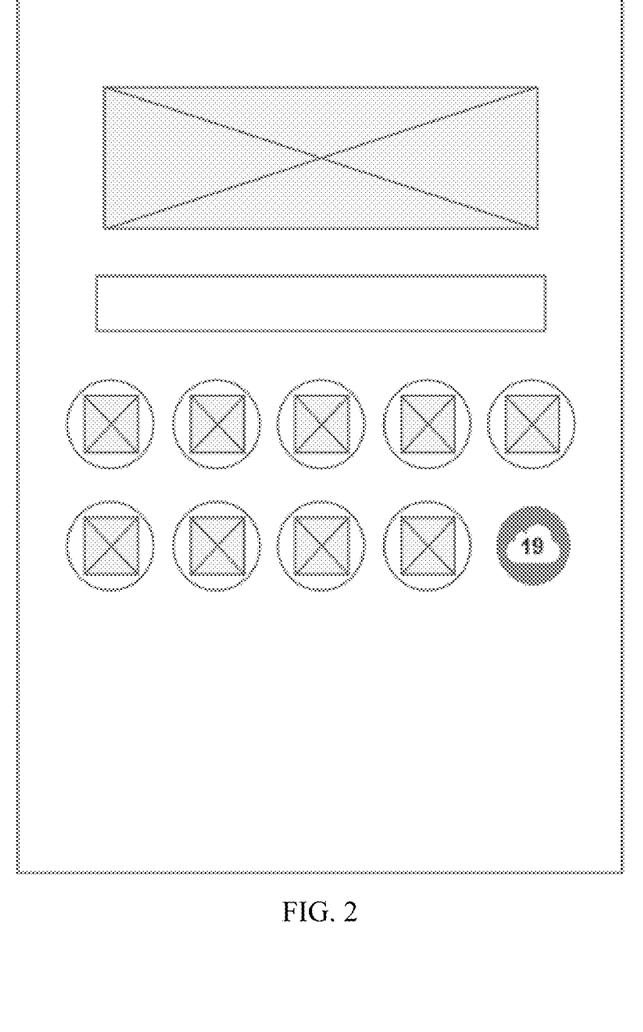
FIG. 2 illustrates a schematic diagram of an exemplary embodiment according to a method consistent with various embodiments of the present disclosure.

FIG. 2 illustrates a schematic diagram of an exemplary embodiment according to a method consistent with various embodiments of the present disclosure.

Referring to FIG. 2, for example, a website navigation icon of China Weather Network (http://www.weather-.com.cn) is provided. The website navigation icon may provide weather information services offered within China Weather Network. For example, a "cloud" pattern and a number "19" may be displayed on the icon to represent that the weather information is cloudy with a temperature of 19 degrees.

Although not shown in FIG. 2, the website navigation icon may also display time information on the icon to show the time corresponding to the weather condition.

In this example, the website navigation icon of China Weather Network is provided. Through the website navigation icon, the weather information services offered by China Weather Network are provided. Therefore, to access the weather information services, the complex process involving clicking on the website navigation icon to enter the website of China Weather Network first and then accessing the weather information services offered by the website may not be necessary.

Optionally, a website navigation icon file for generating the website navigation icon of China Weather Network may be received and stored from the server. For example, the server may generate the corresponding website navigation icon file based on various factors including China Weather Network, weather information services frequently viewed by users, etc. The website navigation icon file may include a corresponding version number, for example, a version number V1.

The stored website navigation icon file can be updated to realize the update of the website navigation icon. For this purpose, the version number V1 of the website navigation icon file may be sent to the server. Based on the version number V1, the server may verify whether there is a website navigation icon file with a more recent version number, for example, a version number V2. When a navigation icon file with the version number V2 exists, the server may send the file to the browser at the client terminal. Further, the browser may provide an updated website navigation icon based on the file.

For example, an updated website navigation icon may, for example, show a "sun" pattern and a number "22" indicating that the current weather conditions are sunny with a temperature of 22 degrees.

Optionally, the website navigation icon may be updated every ten minutes in order to provide the user with the up-to-date weather information service.

In this example, the website navigation icon is updated so that the user can directly access the weather information service provided by China Weather Network through the website navigation icon without having to repeatedly click the icon to enter the website in order to access the weather information service.

Figure 3:
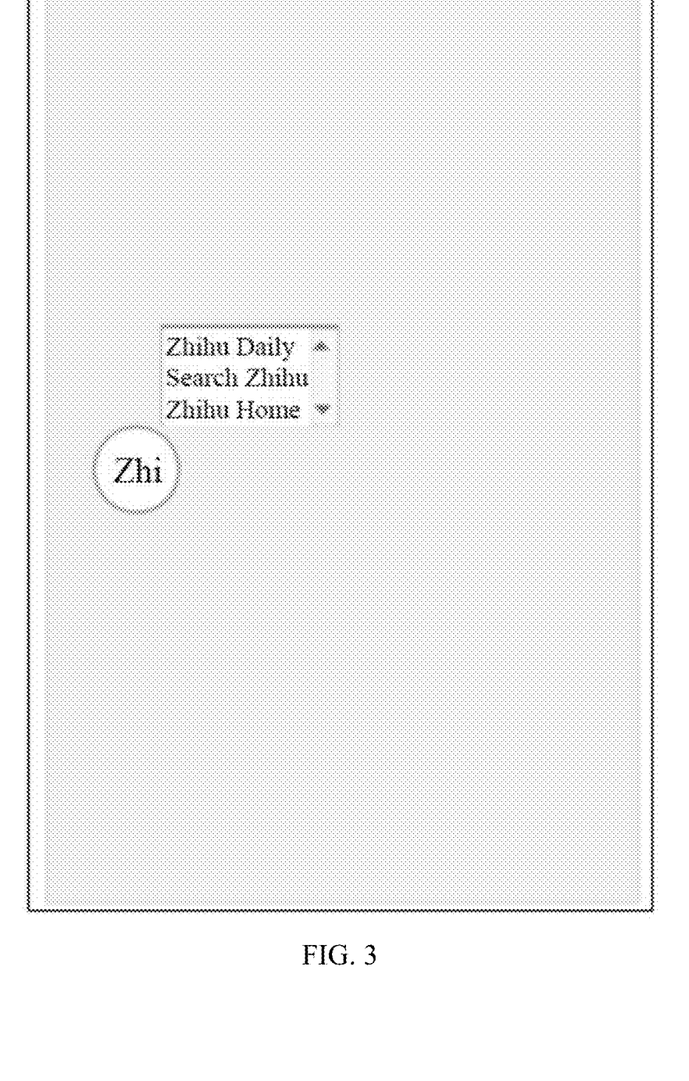
FIG. 3 illustrates a schematic diagram of another exemplary embodiment according to a method consistent with various embodiments of the present disclosure.

FIG. 3 illustrates a schematic diagram of another exemplary embodiment according to a method consistent with various embodiments of the present disclosure.

Referring to FIG. 3, a website navigation icon of the Zhihu website (https://www.zhihu.com) is provided. The website navigation icon provides services of linked items offered in the Zhihu website. FIG. 3 exemplarily shows that the provided linked items may be "Zhihu Daily", "Search Zhihu", and "Zhihu Home".

Optionally, the linked items may be provided when an operation of a user on the website navigation icon, such as long-pressing or double-clicking the icon, is received. For example, the linked items may be displayed as menu items.

According to this example, a website navigation icon of the Zhihu website is provided, and the website navigation icon provides linked items offered in the Zhihu website. Therefore, the user may not need to click on the website navigation icon to enter the website, and may be able to directly access the linked items in the website. In practical applications, the linked items in the website may be more interesting to the user. Therefore, the method according to this example may improve the user experience.

Optionally, a website navigation icon file of the Zhihu website may be received and stored from the server. For example, the server may generate a corresponding navigation icon file for linked items commonly used by users, such as Zhihu Daily, Search Zhihu, etc. The website navigation icon file may include a corresponding version number, for example, a version number V3. Alternatively, the version number may be the current time stamp.

The stored website navigation icon file can be updated to realize the update of the website navigation icon. For this purpose, the version number V3 of the website navigation icon file may be sent to the server. Based on the version number V3, the server may verify whether there is a website navigation icon file with a more recent version number, for example, a version number V4. When a navigation icon file with the version number V4 exists, the server may send the file with the version number V4 to the client terminal. Further, an updated website navigation icon may be provided based on the file.

Optionally, the website navigation icon may be updated on a regular basis or upon request to provide the user with the latest linked items.

According to this example, by updating the website navigation icon, the linked items offered by the website navigation icon may be synchronized with the items in the website such that the updated website services may be provided to the user timely.

Those skilled in the art should understand that in the field of electronic technology, the above method can be embodied in a product through software, hardware, and a combination of software and hardware. Those skill in the art can easily generate an apparatus for providing a website navigation icon based on the method disclosed above. The apparatus may include devices for implementing the various operations in the methods for providing a website navigation icon described above. For example, the apparatus may include a device configured to provide a website navigation icon; and a device configured to, through the website navigation icon, provide a service offered within the website navigated by the website navigation icon.

The apparatus described above for providing a website navigation icon may be an independent apparatus (for example, an application at the client terminal), or may be integrated into a browser and become a part of browser. In this case, the browser may be able to provide a new way to provide website navigation icons.

Those skilled in the art should understand by that, as technology advances, the browser may be a separate application, such as IE browser, Chrome browser, etc., or may be an integrated application having the functions of browsers, such as Weibo applications, WeChat applications, Facebook applications, VK applications, etc.

Figure 4:
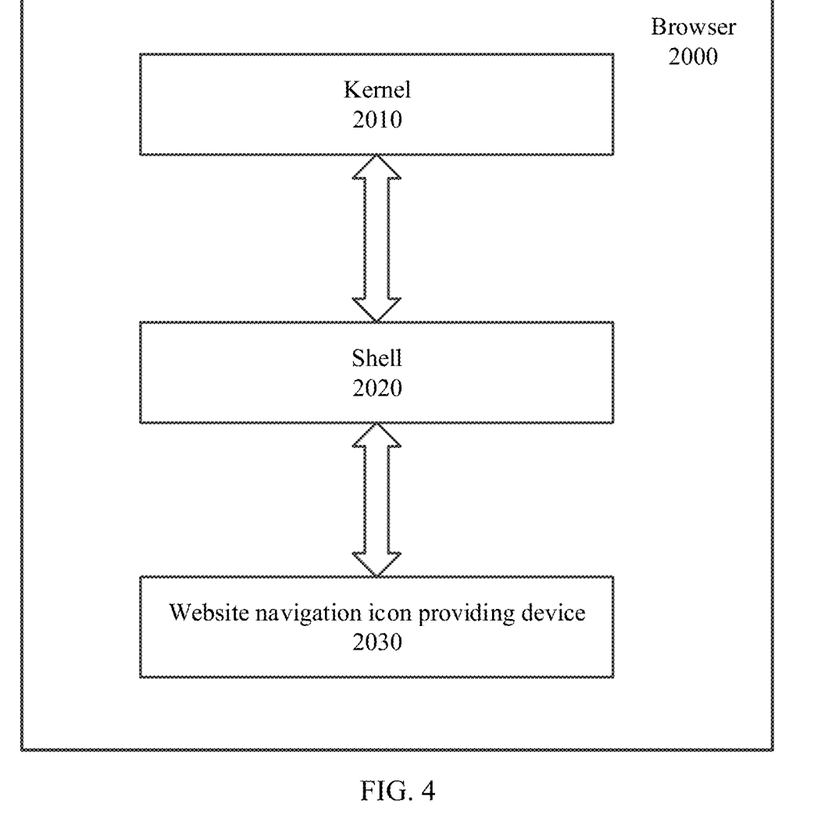
FIG. 4 illustrates a schematic block diagram of an exemplary browser consistent with various embodiments of the present disclosure.

FIG. 4 illustrates a schematic block diagram of an exemplary browser consistent with various embodiments of the present disclosure.

In general, the browser can be divided into two parts from the architecture point of view, namely, the kernel and the shell. The browser kernel is responsible for interpreting the webpage syntax (such as HTML and JavaScript) and rendering (displaying) the webpage. That is, the browser parses and renders the webpage through the kernel. The browser shell mainly handles the appearance of the browser interface and the control experience. Referring to FIG. 4, a browser 2000 may include a kernel 2010 and a shell 2020. The browser 2000 may also include a website navigation icon providing device 2030. The website navigation icon providing device 2030 may be a device for providing website navigation icons according to the present disclosure. For clarity, in FIG. 4, the website navigation icon providing device 2030 is outside the shell 2020 and the kernel 2010; however, those skilled in the art should understand that the website navigation icon providing device 2030 may be located inside the shell 2020 and the kernel 2010.

On the other hand, it is well known to those skilled in the art that with the development of electronic information technology, such as large scale integration (LSI) technology, and the tendency of converting software into hardware, it has become more difficult to clearly define the boundaries between software and hardware in computer systems. The reason is because that any operation can be realized by software, and can also be realized by hardware. The execution of any instruction can be done by hardware or by software as well. For a certain machine function, whether the implementation is made through a hardware solution or a software solution may depend on the price, the speed, the reliability, the storage capacity, the change cycle, and other non-technical factors. Therefore, for an ordinary skill in the art of electronic information technology, a more direct and clear way to describe a technical solution is to describe the various operations in the solution. In the case of knowing the operation that is to be performed, those skilled in the art can directly design the desired product based on consideration of the non-technical factors. In this respect, in an embodiment of the present disclosure, a browser is also provided and the browser may be configured to execute the operation described above for providing website navigation icons according to the embodiments consistent with the present disclosure.

Various embodiments according to the present disclosure may be implemented in an electronic device. The electronic device may be, for example, a laptop, a smart phone, a tablet, etc.

Figure 5:
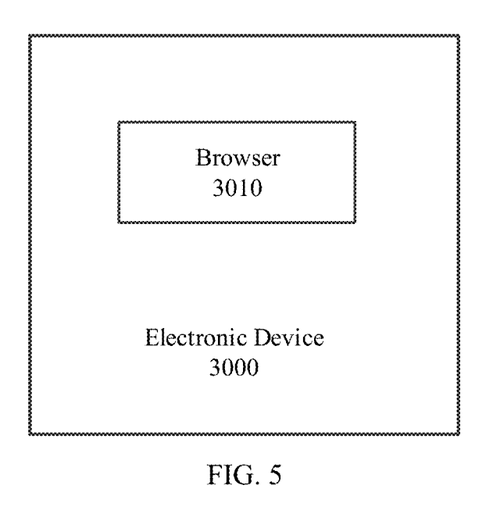
FIG. 5 illustrates a schematic block diagram of an exemplary electronic device consistent with various embodiments of the present disclosure.

FIG. 5 illustrates a schematic block diagram of an exemplary electronic device consistent with various embodiments of the present disclosure. Referring to FIG. 5, an electronic device 3000 may include a browser 3010. The browser 3010 may be, for example, any one of the browsers described above.

Figure 6:
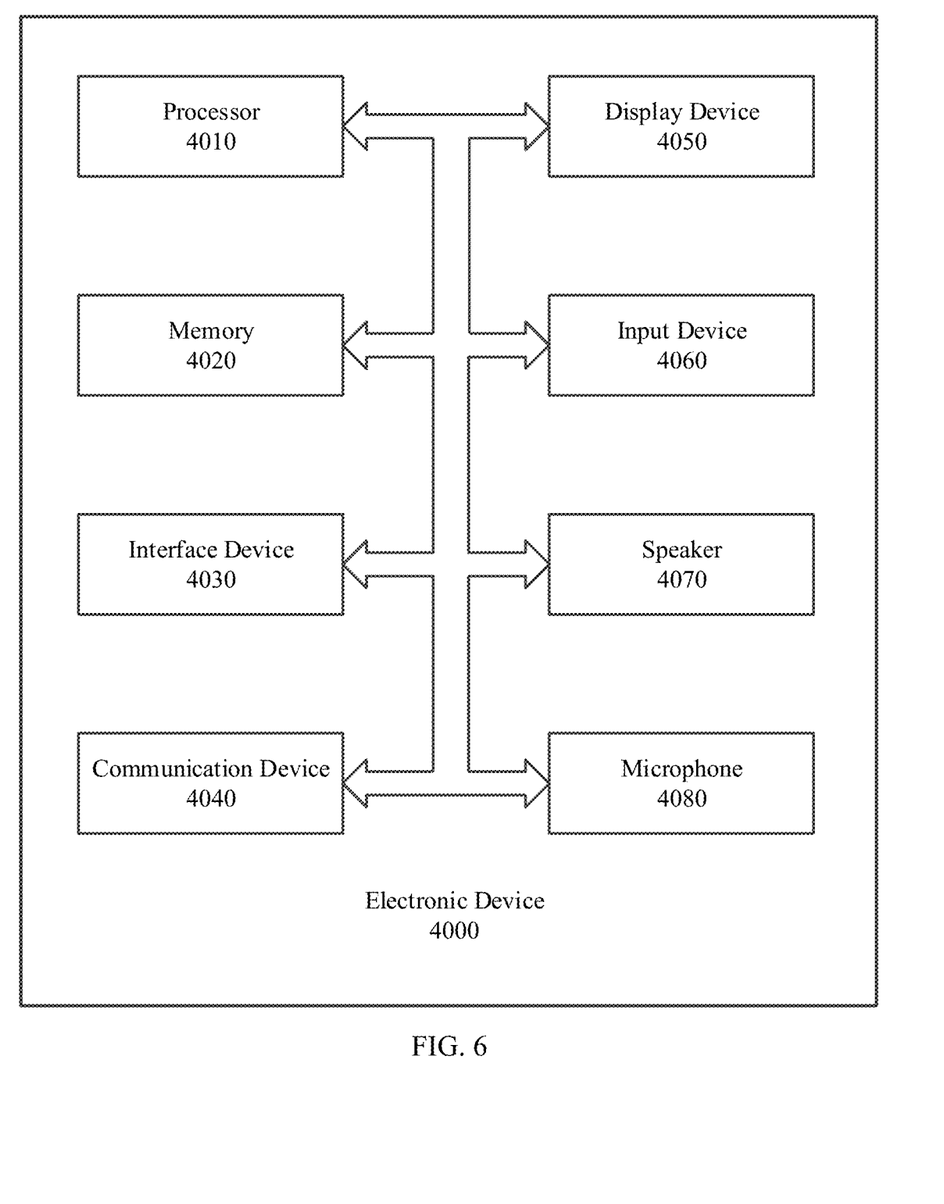
FIG. 6 illustrates a schematic block diagram of another exemplary electronic device consistent with various embodiments of the present disclosure.

FIG. 6 illustrates a schematic block diagram of another exemplary electronic device consistent with various embodiments of the present disclosure.

Referring to FIG. 6, an electronic device 4000 may include a processor 4010, a memory 4020, an interface device 4030, a communication device 4040, a display device 4050, an input device 4060, a speaker 4070, a microphone 4080, etc.

The processor 4010 may be, for example, a central processing unit (CPU), a microcontroller unit (MCU), etc.

The memory 4020 may include, for example, a read-only memory (ROM), a random access memory (RAM), a non-volatile memory such as a hard disk, etc.

The interface device 4030 may include, for example, a universal serial bus (USB) interface, a headphone jack, etc.

The communication device 4040 may be able to, for example, perform wired or wireless communication.

The display device 4050 may be, for example, a liquid crystal display screen, a touch display screen, etc.

The input device 4060 may include, for example, a touch screen, a keyboard, etc.

A user can input or output voice information through the speak 4070 and the microphone 4080.

The electronic device shown in FIG. 6 is merely illustrative, and by no means, is intended to limit the invention and its application or use.

In this embodiment, the memory 4020 is configured to store instructions for controlling the processor 4010 to operate such that the method for providing website navigation icons described above with reference to FIG. 1 is performed. Those skilled in the art should understand that, although multiple devices are shown in FIG. 6, the present disclosure may only involve some of the devices therein, e.g. the processor 4010 and the storage device 4020, etc. Those skilled in the art may design instructions according to the disclosed solution of the present disclosure. How the instructions control the processor to operate is well-known in the art and will not be described in detail here.

The present disclosure may be an apparatus, a method, and/or a computer program product. The computer program product may include a computer-readable storage medium having computer-readable program instructions loaded thereon for controlling the processor to implement various aspects of the present disclosure.

The computer-readable storage medium may be a tangible device that can hold and store the instructions used by the instruction execution device. The computer-readable storage medium may be, but not limited to, an electrical storage device, a magnetic storage device, an optical storage device, an electromagnetic storage device, a semiconductor storage device, or any suitable combination of the above. More specific examples (not an exhaustive list) of the computer-readable storage medium include: portable computer disk, hard disk, RAM, ROM, erasable programmable read-only memory (EPROM or flash memory), static random access memory (SRAM), portable compact disc read-only memory (CD-ROM), digital versatile disc (DVD), memory sticks, floppy disk, mechanical coding device that has instructions stored thereon such as card with punched holes or structures with bulges in grooves, and any suitable combination of the above. The computer-readable storage medium mentioned herein may not be to be interpreted as an instantaneous signal itself, such as radio waves or other freely propagating electromagnetic waves, electromagnetic waves propagating through waveguides or other transmission media (e.g. optical pulses transmitted through optical fiber cables), or electrical signals transmitted through electrical cables.

The computer-readable program instructions described here may be downloaded to various computing/processing devices from a computer-readable storage medium, or downloaded to an external computer or external storage device through a network, such as the Internet, a local area network (LAN), a wide area network (WAN), and/or a wireless network. The network may include copper transmission cables, optical fiber transmission, wireless transmission, routers, firewalls, switches, gateway computers, and/or edge servers. A network adapter card or network interface in each computing/processing device may receive computer-readable program instructions from the network and forward the computer-readable program instructions to computer-readable storage media in various computing/processing devices for storage.

Computer program instructions that are used to execute operations of the present disclosure may be in the forms of assembly instructions, instruction set architecture (ISA) instructions, machine instructions, machine related instructions, microcode, firmware instructions, status setting data, or source code or object code written in one programming language or in any combination of programming languages. The programming languages may include object-oriented programming languages such as Smalltalk, C++, etc., as well as conventional procedural programming languages such as the "C" language or similar programming languages. The computer-readable program instructions may be executed entirely on the user's computer, partly on the user's computer, as a stand-alone software package, partly on the user's computer and partly on a remote computer, or entirely on a remote computer or server. In the case that a remote computer is involved, the remote computer may be connected to the user's computer through any kind of network, including a LAN or a WAN. Alternatively, the remote computer may be connected to an external computer (for example, through the Internet connection provided by an Internet service provider). In some embodiments, custom electronic circuits, such as programmable logic circuits, field programmable gate arrays (FPGAs), or programmable logic arrays (PLA), may be personalized using the status information of the computer-readable program instructions. Such electronic circuits may be able to execute computer-readable program instructions, and thus implement various aspects of the present disclosure.

The various aspects of the disclosure are described with reference to the flowcharts and/or the block diagrams of the methods, the apparatuses (Systems), and the computer program products according to the embodiments of the present disclosure. It should be understood that every block of the flowcharts and/or the block diagrams or any combination of the blocks in the flowcharts and/or the block diagrams can be realized by computer-readable program instructions.

These computer-readable program instructions may be provided to a processor of a general purpose computer, a special purpose computer, or any other programmable data processing apparatus to generate a machine such that when the instructions executed by the processor of the computer or other programmable data processing apparatus, an apparatus may be created to implement the function/action specified in one or more blocks of the flowcharts and/or the block diagrams. These computer-readable program instructions may also be stored in a computer readable storage medium. These instructions may control the computer, the programmable data processing apparatus, and/or any other device to function in a particular manner such that the computer-readable medium having instructions stored thereon may include a manufacturing product, which comprises instructions implementing various aspects of the function/action specified in one or more blocks of the flowcharts and/or the block diagrams.

The computer-readable program instructions may also be loaded onto a computer, other programmable data processing apparatus, or other device to allow execution of a series of operational steps on the computer, other programmable data processing apparatus, or other device, and thus produce a computer-implemented process. As such, the instructions executed on the computer, other programmable data processing apparatus, or other device may realize the function/action specified in one or more of the blocks in the flowcharts and/or the block diagrams.

The flowcharts and the block diagrams in the accompanying figures illustrate the architecture, the functionality, and the operation of possible implementations of the systems, the methods, and the computer program products according to various embodiments of the present disclosure. In this regard, each block of the flowcharts or the block diagrams can represent a module, a program section, or a portion of an instruction that contains one or more instructions for implementing executable instructions of a specified logic function. In some alternative implementations, the functions labeled in the blocks may occur in an order different from the order noted in the figures. For example, two consecutive blocks may in fact be executed substantially in parallel, and sometimes they may be executed in the reverse order, depending on the functions involved. It is also to be noted that each block of the block diagrams and/or the flowcharts, and any combination of the blocks in the block diagrams and/or the flowcharts, can be implemented by special purpose hardware-based systems that perform specified functions or actions, or may be implemented using a combination of dedicated hardware and computer instructions. It is well known to those skilled in the art that the implementation by hardware, the implementation by software, and the combination by software and hardware are all equivalent.

The various embodiments of the present invention have been described above. The above description is exemplary, not exhaustive, and is not intended to be limited to the disclosed embodiments. Many modifications and variations should be apparent to those skilled in the art without departing from the scope and the spirit of the illustrated embodiments. The terminology used herein was chosen to best explain the principles of the embodiments, the practical applications, or the improvements to the techniques in the market, or to enable others of ordinary skill in the art to understand the embodiments disclosed herein. The scope of the disclosure is defined by the appended claims.

What is claimed is:

1. A method for providing a website navigation icon, comprising:
   receiving a website navigation icon file of a website in response to an opening of a browser by a user, wherein the website navigation icon file is generated by a server;
   generating the web site navigation icon for the web site in the browser based on the web site navigation icon file;
   displaying service information associated with the website directly on the website navigation icon, wherein the service information is related to at least one service that is selected, by the server, from a plurality of services of the website based on service interaction data associated with the user;
   in response to receiving a single-clicking on the website navigation icon, triggering displaying a homepage of the website; and
   in response to receiving a double-clicking on the website navigation icon, triggering displaying a plurality of menu items outside of the website navigation icon, wherein the plurality of menu items are associated with a plurality of linked items that are offered within the web site, wherein triggering displaying the plurality of menu items further comprises:
      selecting the plurality of menu items based on user preference data associated with the user and related to the website of the website navigation icon.

2. The method according to claim 1, further including:
   storing the website navigation icon file.

3. The method according to claim 2, wherein the website navigation icon file includes:
   a version number corresponding to the website navigation icon file.

4. The method according to claim 3, further including:
   updating the stored website navigation icon file.

5. The method according to claim 4, wherein updating the stored website navigation icon file includes:
   sending the version number corresponding to the stored website navigation icon file to the server;
   receiving an updated website navigation icon file from the server; and
   providing an updated website navigation icon according to the updated website navigation icon file.

6. The method according to claim 5, wherein the updated website navigation icon is provided at a predetermined time interval.

7. The method according to claim 1, wherein the plurality of linked items is provided by using client-terminal cached website information.

8. The method according to claim 7, wherein using the client-terminal cached website information is determined based on determining that the browser is connected to a mobile data network.

9. The method according to claim 1, wherein the plurality of linked items comprise a plurality of website channels, wherein the method further comprises:
   determining the plurality of website channels based on access frequencies associated with the user.

10. The method of claim 1, further comprising:
    in response to an opening of a window associated with the browser, updating the website navigation icon file associated with the website navigation icon.

11. The method of claim 1, further comprising:
    in response to an opening of a tab associated with the browser, updating the website navigation icon file associated with the website navigation icon.

12. The method of claim 1, wherein the server is configured to generate a plurality of website navigation icon files associated the website for a plurality of users based on a plurality of service interaction data associated with the plurality of users.

13. A browser, comprising:
    an apparatus for providing a website navigation icon of a website, the apparatus comprising:
       a first device configured to:
          receive a website navigation icon file of the website in response to an opening the browser by a user, wherein the website navigation icon file is generated by a server, and
          generate the website navigation icon for the website in the browser based on the website navigation icon file; and
       a second device configured to display service information associated with the website directly on the website navigation icon, wherein the service information is related to at least one service that is selected, by the server, from a plurality of services of the website based on service interaction data associated with the user, wherein the second device is configured to:
          in response to receiving a single-clicking on the website navigation icon, triggering displaying a homepage of the website, and
          in response to in response to receiving a double-clicking on the website navigation icon, trigger displaying a plurality of menu items outside of the website navigation icon, wherein the plurality of menu items are associated with a plurality of linked items that are offered within the website, wherein the second device is configured to:
             select the plurality of menu items based on user preference data associated with the user and related to the website of the website navigation icon.

14. The browser according to claim 13, further including:
a kernel for interpreting webpage syntax and rendering webpages; and
a shell for handling appearance of a browser interface and control experience.

15. The browser according to claim 13, wherein the plurality of linked items comprise a plurality of website channels, wherein the second device is configured to:
determine the plurality of website channels based on access frequencies associated with the user.

16. The browser according to claim 13, wherein the server is configured to generate a plurality of website navigation icon files associated the website for a plurality of users based on a plurality of service interaction data associated with the plurality of users.

17. An electronic device including a browser according to claim 16.

18. An electronic device, comprising:
a processor;
a memory; and
a display,
wherein the memory is configured to store instructions, the instructions being used to control the processor to perform an operation to execute a method for providing a website navigation icon, wherein, when the instructions are executed, the memory and the processor are configured to cause the electronic device to:
receive a website navigation icon file of a website in response to an opening of a browser by a user, wherein the website navigation icon file is generated by a server;
generate the website navigation icon for the website in the browser based on the website navigation icon file;
display service information associated with the website directly on the website navigation icon, wherein the service information is related to at least one service that is selected, by the server, from a plurality of services of the website based on service interaction data associated with the user;
in response to receiving a single-clicking on the website navigation icon, trigger displaying a homepage of the website; and
in response to receiving a double-clicking on the website navigation icon, trigger displaying a plurality of menu items outside of the website navigation icon, wherein the plurality of menu items are associated with a plurality of linked items that are offered within the website, wherein, when the instructions are executed, the memory and the processor are configured to cause the electronic device to:
select the plurality of menu items based on user preference data associated with the user and related to the website of the website navigation icon.

19. The electronic device according to claim 18, further including at least one of:
an interface device;
a communication device;
an input device;
a speaker; and
a microphone.

20. The electronic device according to claim 18, wherein the memory and the processor are configured to cause the electronic device to:
store the website navigation icon file, wherein the website navigation icon file includes a version number corresponding to the website navigation icon file, and
update the stored website navigation icon file.

* * * * *

UNITED STATES PATENT AND TRADEMARK OFFICE
CERTIFICATE OF CORRECTION

| | |
|---|---|
| PATENT NO. | : 11,327,632 B2 |
| APPLICATION NO. | : 15/914511 |
| DATED | : May 10, 2022 |
| INVENTOR(S) | : Xun Zhang |

It is certified that error appears in the above-identified patent and that said Letters Patent is hereby corrected as shown below:

In the Claims

In Column 11, Line 35, Claim 1, delete "generating the web site" and insert -- generating the website --, therefor.

In Column 11, Line 35, Claim 1, delete "icon for the web site" and insert -- icon for the website --, therefor.

In Column 11, Line 36, Claim 1, delete "web site" and insert -- website --, therefor.

In Column 11, Line 51, Claim 1, delete "web site," and insert -- website, --, therefor.

Signed and Sealed this
Twenty-seventh Day of December, 2022

Katherine Kelly Vidal
*Director of the United States Patent and Trademark Office*